United States Patent
Weber et al.

(10) Patent No.: US 10,770,957 B2
(45) Date of Patent: Sep. 8, 2020

(54) METHOD FOR PRODUCING A SHORT CIRCUIT ROTOR AND SHORT CIRCUIT ROTOR

(71) Applicant: AUDI AG, Ingolstadt (DE)

(72) Inventors: Korbinian Weber, Ingolstadt (DE); Jörg Rücker, Hilpoltstein (DE)

(73) Assignee: AUDI AG, Ingolstadt (DE)

(*) Notice: Subject to any disclaimer, the term of this patent is extended or adjusted under 35 U.S.C. 154(b) by 167 days.

(21) Appl. No.: 15/915,661

(22) Filed: Mar. 8, 2018

(65) Prior Publication Data
US 2018/0301966 A1    Oct. 18, 2018

(30) Foreign Application Priority Data
Apr. 18, 2017  (DE) .................. 10 2017 206 520

(51) Int. Cl.
| | |
|---|---|
| H02K 17/16 | (2006.01) |
| H02K 3/02 | (2006.01) |
| B23K 26/21 | (2014.01) |
| H02K 15/00 | (2006.01) |

(52) U.S. Cl.
CPC ........... H02K 17/165 (2013.01); B23K 26/21 (2015.10); H02K 3/02 (2013.01); H02K 15/0012 (2013.01); H02K 17/16 (2013.01)

(58) Field of Classification Search
CPC ...... H02K 17/16; H02K 17/165; H02K 17/18; H02K 17/185; H02K 15/0012; H02K 3/02; B23K 26/21
USPC ............................ 310/125, 211, 212; 29/598
See application file for complete search history.

(56) References Cited

U.S. PATENT DOCUMENTS

| | | | |
|---|---|---|---|
| 3,517,238 A | 6/1970 | Lake | |
| 3,705,971 A | 12/1972 | Jacovides et al. | |
| 9,570,968 B1 | 2/2017 | Chen et al. | |
| 2009/0033170 A1 | 2/2009 | Jakobi et al. | |

(Continued)

FOREIGN PATENT DOCUMENTS

| | | |
|---|---|---|
| DE | 10 2005 030 798 A1 | 1/2007 |
| DE | 10 2013 202 404 A1 | 8/2014 |

(Continued)

OTHER PUBLICATIONS

Search Report dated Aug. 29, 2018 in corresponding European Patent Application No. 18157981.4; 9 pages.

(Continued)

*Primary Examiner* — Quyen P Leung
*Assistant Examiner* — Alexander A Singh
(74) *Attorney, Agent, or Firm* — Maier & Maier, PLLC

(57) ABSTRACT

A method for producing a short circuit rotor, by providing a laminated rotor core with through openings for shorting bars of a squirrel cage as well as providing the shorting bars; inserting of the shorting bars into the through openings such that an axial overhang remains on both sides; placing a main disk with through openings on both sides for the shorting bars, whose axial length corresponds to the overhang, as well as an edge disk immediately adjacent to the main disk and the ends of the shorting bars. The main disk and the edge disk form a shorting ring of the squirrel cage, and the main disk and the edge disk are welded by radially encircling electron beam welding.

6 Claims, 2 Drawing Sheets

(56) References Cited

U.S. PATENT DOCUMENTS

| | | | | |
|---|---|---|---|---|
| 2014/0132105 A1* | 5/2014 | Kleber | ............... | H02K 15/0012 |
| | | | | 310/211 |
| 2014/0339950 A1 | 11/2014 | Nelson et al. | | |
| 2018/0287472 A1* | 10/2018 | Lichtinger | ......... | H02K 15/0012 |

FOREIGN PATENT DOCUMENTS

| | | |
|---|---|---|
| DE | 10 2013 202 557 A1 | 8/2014 |
| DE | 10 2013 005 050 A1 | 9/2014 |
| DE | 10 2013 223 054 A1 | 5/2015 |
| DE | 10 2014 013 684 A1 | 3/2016 |
| DE | 10 2015 223 058 A1 | 5/2017 |
| DE | 10 2016 203 143 A1 | 8/2017 |
| JP | H10-52014 A | 2/1998 |
| JP | 3480185 B2 | 12/2003 |
| WO | 2015/172920 A1 | 11/2015 |

OTHER PUBLICATIONS

Office Action dated Sep. 29, 2019, in corresponding Chinese Application No. 201810336668.1; 15 pages.
European Office Action dated Nov. 6, 2019, in connection with corresponding EP Application No. 18157981.4 (10 pgs., including machine-generated English translation).
German Search Report dated Jan. 11, 2018 of corresponding German application No. 102017206520.6; 8 pgs.
European Office Action dated Jun. 16, 2020, in connection with corresponding EP Application No. 18 157 981.4 (14 pp., including machine-generated English translation).
Office Action dated Jun. 15, 2020 in corresponding Chinese Application No. 201810336668.1; 14 pages including English-language translation.

* cited by examiner

METHOD FOR PRODUCING A SHORT CIRCUIT ROTOR AND SHORT CIRCUIT ROTOR

FIELD

The invention relates to a method for producing a short circuit rotor and a short circuit rotor, especially for an asynchronous machine.

BACKGROUND

Various designs have already been proposed in the prior art for squirrel cages in short circuit rotors of asynchronous machines composed of copper and/or aluminum semifabricated pieces.

DE 10 2013 005 050 A1 discloses a short circuit rotor as well as a method for production of a short circuit rotor, wherein at least a portion of a shorting ring is composed of a disk stack, which is constructed of layers of disks with cavities through which the ends of the cage bars pass from the rotor lamination stack. The end faces of the disks of a shorting ring have at least one bevel along the outer periphery, which extends radially at least as far as the ends of the cage bars protruding from the rotor lamination stack. In other words, a freely accessible opening extends between neighboring disks as far as the level of the cage bars, so that the individual pieces can be joined together both electrically and mechanically.

DE 10 2014 013 684 A1 relates to a short circuit rotor for an asynchronous machine in which likewise several shorting rings arranged at the end faces of the rotor lamination stack are provided, having cavities into which the end regions of the rotor crosspieces protrude. It is proposed that the shorting rings each time are composed of at least two metal composite disks, which are made up of at least a first metal disk and a second metal disk joined to the latter by its surface and made from a different material.

One benefit of such a design is therefore the possibility of using different materials in the shorting rings, such as combining copper disks with copper alloy disks (CuCrZr or similar alloys) in order to boost the rotational speed capability and temperature stability of the asynchronous machine. The drawback, however, is that the welding process proposed therein alters the properties of alloyed copper and/or aluminum disks. In particular, due to the heating of these types of alloys to the welding temperature, they lose their properties in terms of strength and temperature stability. Assuming a rotor with relatively thin, easily fabricated individual disks, only a relatively small portion with the originally desired properties remains after the welding of the individual alloyed disks.

US 2014/0339950 A1 relates to a rotor arrangement with end caps, which should be welded by electron beam welding. This should produce improved electrical and mechanical properties in an arrangement of a lower weight. Specifically, a single end disk is described with axially noncontinuous grooves.

The drawback here is that the welding process occurs directly on the laminated rotor core and in the half-open grooves of the shorting disk. In this way, a very large input of heat into the laminated stack occurs, which may result in damage to the insulation. The molten welding pool can only be guided to a very limited degree and it readily flows.

DE 10 2013 202 557 A1 relates to a squirrel cage for a short circuit rotor and a manufacturing process for same. In this case, it is proposed to assemble the shorting rings from a connecting disk and a shorting disk, wherein the connecting disk has a plurality of cavities, in each of which is arranged a cage bar, so that the plurality of cage bars are mechanically fixed in relation to the connecting disk. The shorting disk lies immediately against the connecting disk in the axial direction. A materially-bonded connection between the cage bars and the connecting disk should be produced by means of a welded connection, a materially-bonded connection between the connecting disk and the shorting disk by means of a soldered connection.

Here as well, therefore, a welding occurs near the laminated rotor core, which may result in difficulties in regard to the insulation and the guidance of the molten welding pool. Especially in this embodiment, only the relatively thin connecting disk is welded to the shorting bars, preferably from an axial direction. This increases the risk of further flowing of the molten welding pool, since even with slight tolerance deviations or slight deviations in the welding parameters, the molten pool will flow into the joints between shorting bar and laminated stack or connecting disk and laminated stack. Hence, a large heat input into the laminated rotor core will occur. Another drawback is that the soldered connections of the shorting disk to the connecting disk result in lower strength and electrical conductivity as compared to welded connections. But since the shorting disk makes up the greater portion of the electrically conductive cross section of the ring, a relatively large centrifugal force acts on this ring.

SUMMARY

Therefore, the object of the invention is to indicate an improved, economical and easily performed production method, and a correspondingly produced, improved short circuit rotor.

In order to achieve this object, a method is proposed according to the invention for producing a short circuit rotor, involving the following steps:
  providing a laminated rotor core with through openings for shorting bars of a squirrel cage as well as providing the shorting bars,
  inserting the shorting bars into the through openings such that an axial overhang remains on both sides,
  placing a main disk with through openings on both sides for the shorting bars, whose axial length corresponds to the overhang, as well as a continuous edge disk immediately adjacent to the main disk and the ends of the shorting bars, wherein the main disk and the edge disk form a shorting ring of the squirrel cage,
  welding at least the main disk and the edge disk by means of radially encircling electron beam welding.

Hence, by the welding process, all components of the shorting ring (main disk, edge disk, shorting bars) are welded. According to the invention, it is proposed to use a main disk with cavities for the shorting bars and to combine this with a continuous edge disk, hence one having no cavities or through openings or grooves for the shorting bars, wherein the main disk and the edge disk are joined together by means of radial electron beam welding. In this way, it is possible to completely join the entire, ideally compressed assemblage of laminated stack, shorting bars and the respective shorting rings with only one welded seam. The length of the shorting bars and the compressing force of the assembly should be dimensioned such that an axial contact is produced between each shorting bar and the edge disk.

A preferred embodiment of the invention therefore proposes that the short circuit rotor is axially compressed prior to the welding of the main disk and the edge disk, so that the ends of the shorting bars lie against the edge disk with material bonding. A clamping device can be used for applying such an axial prestressing.

This achieves a number of advantages over the prior art. Thus, as compared to a design with only a single disk with axially noncontinuous grooves, the distance of the welded seam from the laminated stack is increased by the main disk, so that the heat input into the laminated rotor core is reduced. Furthermore, thanks to the main disk pressed together with the edge disk no possibility of flowing is provided to the resulting molten welding pool, since the welding is carried out in a solid, closed geometry.

As compared to embodiments with disks having only through openings in the shorting rings, the advantage results that only one disk with cavities needs to be produced for each shorting ring by way of stamping processes with a corresponding blank. The edge disk may be produced economically, for example as a cutout from an extruded profile, for example. Furthermore, the process time for the cost-intensive electron beam welding is reduced to only a single encircling welded seam. A further benefit is that the edge disk forms a continuous supporting disk with no cavities for the shorting bars, so that the rotational speed strength can be more effectively increased by higher-strength materials. This is because there remains a larger fraction of an especially higher-strength material of the edge disk, which results in a higher-rotational speed strength. Moreover, thanks to only a single, radial electron beam welded seam when using higher-strength disk materials, the higher-strength material and, on the whole, the properties of the material of the main disk and the edge disk are better preserved.

As compared to embodiments in which the shorting bars are welded to connecting disks and then the shorting disks are soldered to the connecting disks, there is the benefit that the number of work steps is significantly reduced, since according to the invention all disks are placed on top of each other in one work step and then welded together by a single welding step by means of a radially oriented and tangentially encircling electron beam. This produces a higher strength and electrical conductivity of the connection between the main disk and the edge disk, since a welding process is used instead of a soldering process. The heat input into the laminated rotor core during the welding is reduced, since the welded connection does not exist directly on the laminated rotor core and furthermore, it is radially oriented. All components are joined in a single step, without an additional joint material being required. Hence, a simple and economical production process is described, resulting in a short circuit rotor with optimal properties in regard to conductivity of the shorting ring, of the connections, and of the torsional strength.

In order to further increase the torsional strength, one advantageous enhancement of the invention proposes that after the welding a clamping ring is placed each time around a pair made of a main disk and an edge disk, and tightened. Such a clamping ring, for example, may be composed of materials based on steel, titanium, or nickel, or a similar alloy, and it increases the torsional strength, especially when both the edge disk and the main disk are not made from higher-strength materials, but instead, for example both of them are simple copper and/or aluminum disks, without higher-strength alloys such as CuCrZr. Hence, the use of a clamping ring opens up the possibility of also producing the main disk and the edge disk from the same high conductivity material, while the required torsional strength is achieved by way of the clamping ring.

Of course, however, embodiments are also conceivable, in which higher-strength materials are used in the main disk and/or especially the edge disk, such as CuCrZr or even steel, for example.

Regarding the thicknesses of the main disk and the edge disk, various embodiments are likewise conceivable. One embodiment with a main disk whose thickness, i.e., axial extension, is greater than that of the edge disk, may afford the advantage that the main disk forms a rather large spacer relative to the laminated rotor core, which is less influenced by the welding. A thinner main disk, especially as compared to the edge disk, has the advantage that it is more easily possible to punch out the through openings of the main disk. However, a punching is not absolutely necessary, since rather thick main disks can also be produced as blanks cut to the appropriate length from an extruded profile. In practice, it has proven to be advantageous to employ a favorable fabrication process for the main disk, and therefore to select a disk which is rather thin and thus easily punched.

In addition to the method, the invention also relates to a short circuit rotor, especially one produced by the method according to the invention, comprising a laminated rotor core and a squirrel cage with shorting bars extending through continuous openings in the laminated rotor core, and shorting rings which axially short-circuit the shorting bars on both sides, wherein each shorting ring comprises a main disk with through openings, through which the shorting bars extend and project out from the laminated rotor core, especially in form-fitting manner, and an edge disk following the main disk immediately on the axially outer side, against which the shorting bars lie in materially-bonded manner, which is characterized in that the edge disk and the main disk are radially welded together by electron beam welding. The remarks relative to the production method can be applied in analogous fashion to the short circuit rotor. In particular, a joining method is used without joint material, taking place away from the laminated rotor core, so that a short circuit rotor with significantly improved properties is manufactured in a simple production process.

Preferably, the edge disk and/or the main disk can be composed of copper and/or aluminum and/or an alloy comprising copper and/or aluminum. The remarks regarding the production process also apply here accordingly. A preferred embodiment example proposes that the edge disk is composed of a higher-strength material than the main disk and thus acts as a supporting disk.

An especially expedient configuration results in the case when the main disk and edge disk are not composed of a higher-strength alloy and/or are composed of the same materials, the shorting ring being radially surrounded by a clamping ring. In particular, this makes it possible to produce the main disk and the edge disk as copper and/or aluminum disks, yet still achieve the required torsional strength with the aid of the clamping ring.

BRIEF DESCRIPTION OF THE FIGURES

Further benefits and details of the present invention will emerge from the exemplary embodiments described in the following, as well as based on the drawing. Shown here.

DETAILED DESCRIPTION OF THE FIGURES

Figure 1:
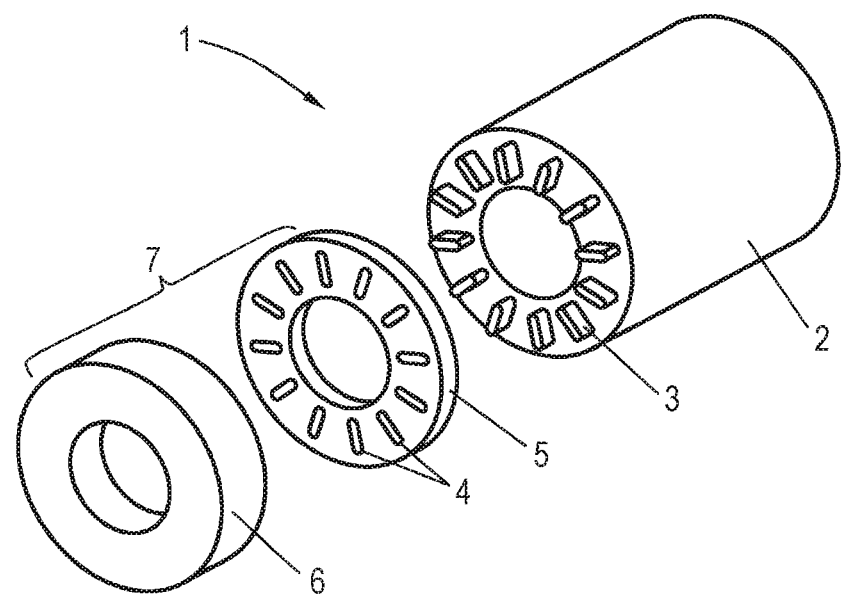
FIG. 1 an exploded drawing of one side of a short circuit rotor according to the invention, FIG. 2 a perspective view of the side of the joined short circuit rotor according to the invention, and FIG. 3 a cross-sectional view of the side of the short circuit rotor according to the invention.

FIG. 1 shows basic components of one side of a short circuit rotor 1 according to the invention in an exploded view, the axially opposite side of the short circuit rotor 1, which is not shown, being a mirror image. The short circuit rotor 1 comprises, prior to the joining of its components shown here, a laminated rotor core 2, such as is basically known in the prior art. The laminated rotor core 2 has through openings, in which the shorting bars 3 of a squirrel cage of the short circuit rotor 1 are already inserted here. The shorting bars 3 stick out axially on both sides, so as to be able to engage with a form fit in through openings or cavities 4 of a main disk 5. The axial closure of the short circuit rotor 1 is formed by an edge disk 6, having no cavities or openings of any kind for the shorting bars 3, since it should lie against the latter with material bonding. The main disk 5 and the edge disk 6 form the shorting ring 7 of the squirrel cage.

Figure 2:
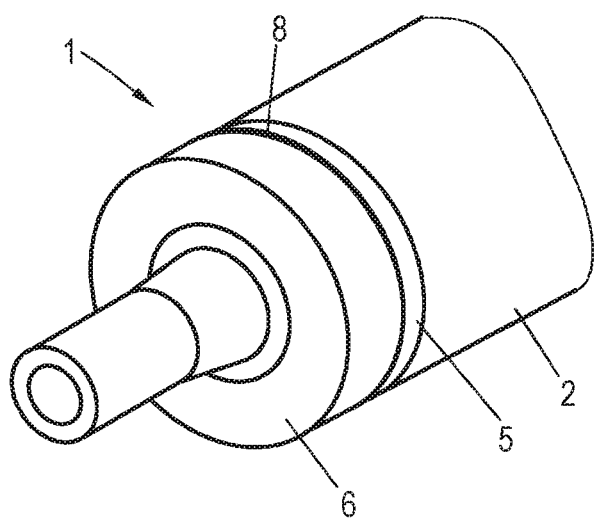

In order to fabricate the short circuit rotor 1, the components shown in the exploded view are assembled together axially and compressed by means of a clamping device, so that not only does the main disk 5 lie against the edge disk 6 with material bonding, but also the shorting bars 3 lie against the edge disk 6 with material bonding. Being thus prestressed by the clamping device in this way, a radial electron beam welding is then carried out in order to join the main disk 5 to the edge disk 6. A perspective view of the short circuit rotor 1 thus joined in only a single step is shown in FIG. 2. Also indicated there is the weld 8 between the main disk 5 and the edge disk 6, the electron beam welding also extending to a connecting of the shorting bars 3 to the edge disk 6.

Figure 3:
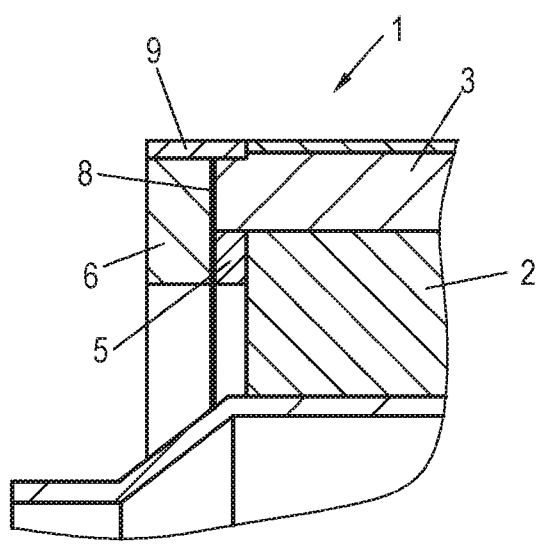

This is clearly recognizable in the cross-sectional view of the joined short circuit rotor 1 in FIG. 3, since the weld 8 also extends beyond the shorting bars 3.

In the present exemplary embodiment, the main disk 5 is chosen to be thinner than the edge disk 6, so that the through openings 4 of the main disk 5 can be punched out. An embodiment is also conceivable in which the main disk 5 is thicker than the edge disk 6, in order to create a greater distance from the laminated stack 2 during the welding.

Optionally, a clamping ring 9 as indicated in FIG. 3 may also extend radially about the shorting ring 7. The use of such a clamping ring 9 proves to be especially advantageous when a higher torsional strength is required than is provided by the configuration of the disks 5, 6, for example when the disks 5, 6 both are not composed of a higher-strength material, or, for example, when they are formed as simple copper and/or aluminum disks. The clamping ring 9 may be pulled over the shorting ring 7 from the main disk 5 and the edge disk 6 after the electron beam welding.

A short circuit rotor according to the invention may be installed in general in an asynchronous machine, which also has an appropriate stator. The asynchronous machine may be used with special advantage inside a motor vehicle.

The invention claimed is:

1. A method for producing a short circuit rotor, comprising:
   providing a laminated rotor core with through openings for shorting bars of a squirrel cage as well as providing the shorting bars,
   inserting the shorting bars into the through openings such that an axial overhang remains on both sides,
   placing a main disk with through openings on both sides for the shorting bars, whose axial length corresponds to the overhang, as well as a continuous edge disk immediately adjacent to the main disk and the ends of the shorting bars, wherein the main disk and the edge disk form a shorting ring of the squirrel cage,
   welding the main disk and the edge disk by means of radially encircling electron beam welding,
   wherein the short circuit rotor is axially compressed prior to the welding of the main disk and the edge disk so that the ends of the shorting bars lie against the edge disk with material bonding, and
   wherein the electron beam welding extends to a connecting of the shorting bars to the edge disk.

2. The method according to claim 1, wherein after the welding, a clamping ring is placed each time around a pair composed of main disk and edge disk and tightened.

3. The method according to claim 1, wherein the through openings of the main disk are punched out.

4. A short circuit rotor, produced according to a method according to claim 1, comprising a laminated rotor core and a squirrel cage with shorting bars extending through continuous openings in the laminated rotor core and shorting rings which axially short-circuit the shorting bars on both sides, wherein each shorting ring comprises a main disk with through openings, through which the shorting bars extend and project out from the laminated rotor core, especially in form fitting-manner, and an edge disk following the main disk immediately on the axially outer side, against which the shorting bars lie in materially-bonded manner,
   hereby characterized
   in that the edge disk and the main disk are radially welded together by electron beam welding.

5. The short circuit rotor according to claim 4, wherein the edge disk and/or the main disk are composed of copper and/or aluminum and/or an alloy comprising copper and/or aluminum, and/or in that the edge disk is composed of a higher-strength material than the main disk.

6. The short circuit rotor according to claim 4, wherein in the case when the main disk and edge disk are not composed of a higher-strength alloy and/or are composed of the same materials, the shorting ring is radially surrounded by a clamping ring.

* * * * *